No. 669,704. Patented Mar. 12, 1901.
F. S. PERRY.
AUTOMATIC WEIGHING MACHINE.
(Application filed Feb. 5, 1900.)

(No Model.) 4 Sheets—Sheet 1.

Witnesses:
F. Forrester
Samuel Dritt

Inventor:
Frank S. Perry
By H. M. Plaisted,
his Atty.

No. 669,704. Patented Mar. 12, 1901.
F. S. PERRY.
AUTOMATIC WEIGHING MACHINE.
(Application filed Feb. 5, 1900.)

(No Model.) 4 Sheets—Sheet 3.

Witnesses:
F. Forrester
Samuel M. Kitt

Inventor:
Frank S. Perry,
By H. M. Plaisted.
his Atty.

THE NORRIS PETERS CO., PHOTO-LITHO., WASHINGTON, D. C.

No. 669,704. Patented Mar. 12, 1901.
F. S. PERRY.
AUTOMATIC WEIGHING MACHINE.
(Application filed Feb. 5, 1900.)
(No Model.) 4 Sheets—Sheet 4.
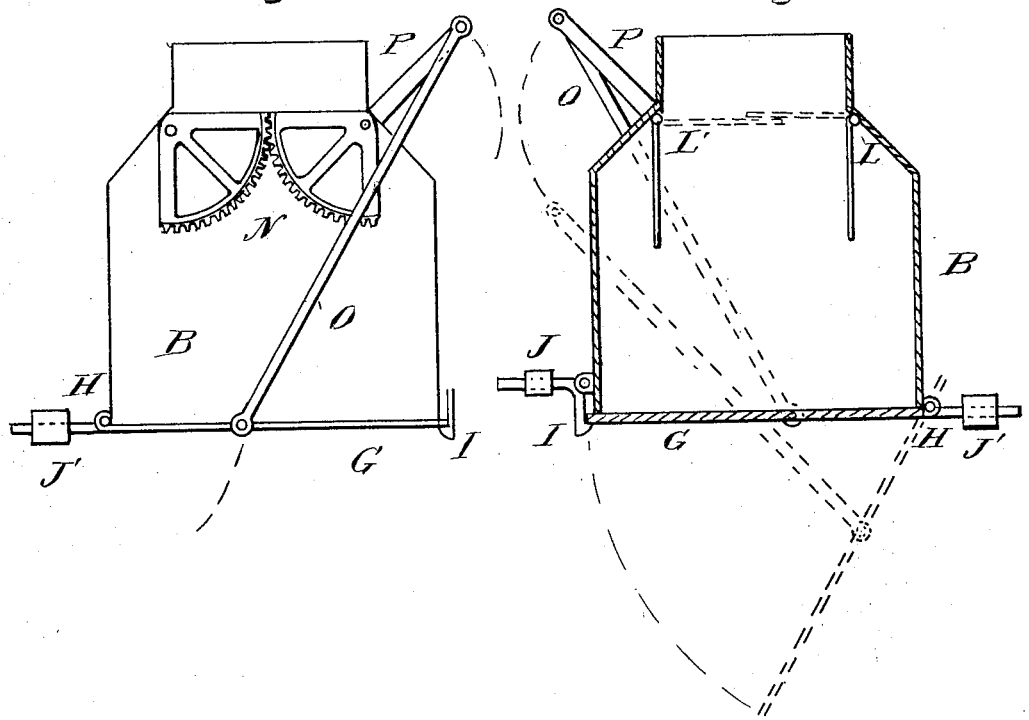
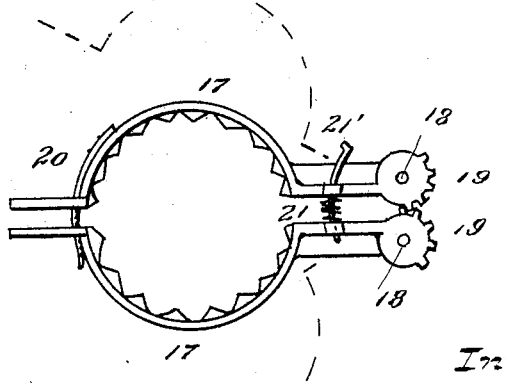
Witnesses:
F. Forrest
Samuel M. Hitt
Inventor,
Frank S. Perry
By H. M. Plaisted
his Atty.

UNITED STATES PATENT OFFICE.

FRANK S. PERRY, OF CALVERT, TEXAS.

AUTOMATIC WEIGHING-MACHINE.

SPECIFICATION forming part of Letters Patent No. 669,704, dated March 12, 1901.

Application filed February 5, 1900. Serial No. 3,921. (No model.)

*To all whom it may concern:*

Be it known that I, FRANK S. PERRY, a citizen of the United States, residing at Calvert, in the county of Robertson and State of Texas, have invented certain new and useful Improvements in Automatic Weighing-Machines, of which the following is a specification, reference being had therein to the accompanying drawings.

This invention relates to certain new and useful improvements in automatic weighing-machines.

My improvements have reference to an improved form of hopper, have reference to a feed-regulating mechanism, cut-off, and actuating mechanism, have reference to a scale-beam for the hopper and its interconnection with the feed-regulating mechanism, have reference to adjusting said scale-beam to weigh predetermined loads and to a tester therefor, and to other points hereinafter described and claimed.

Figure 1:
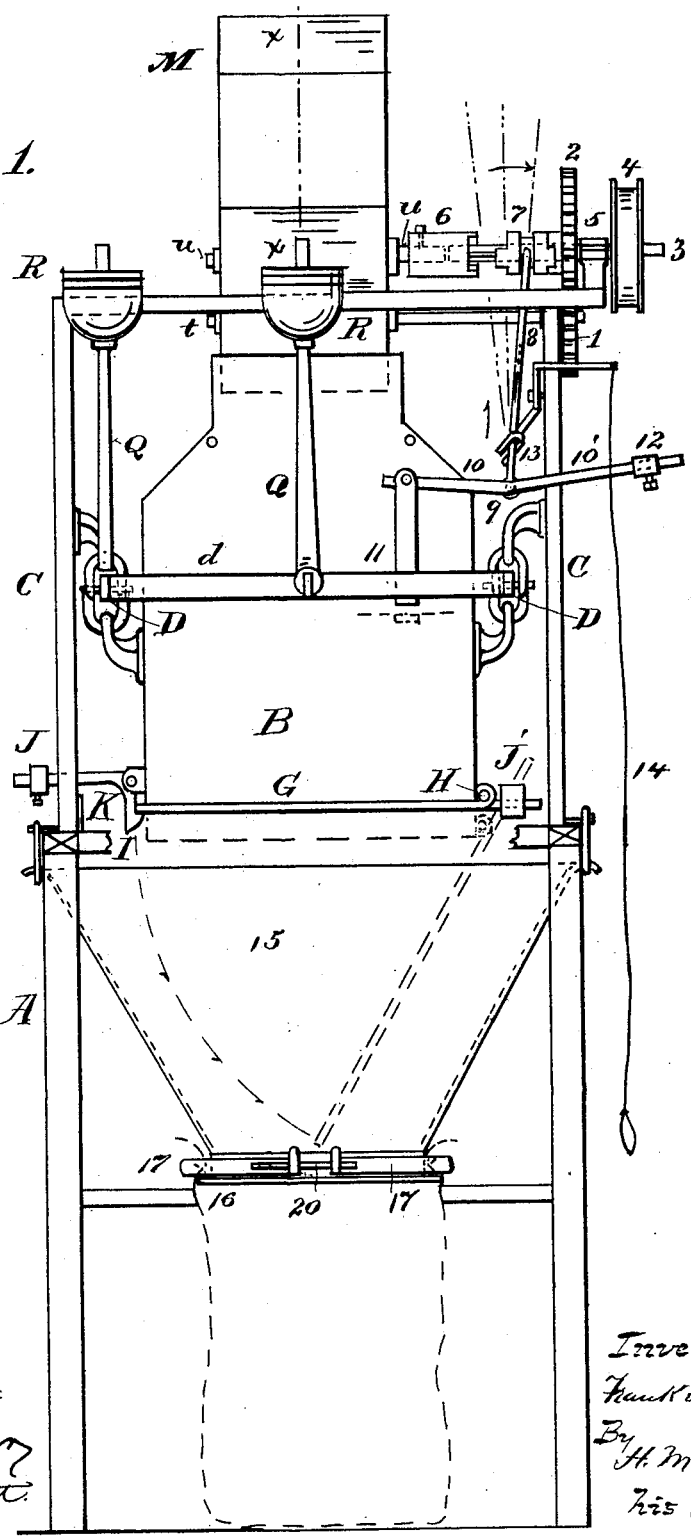
Figure 2:
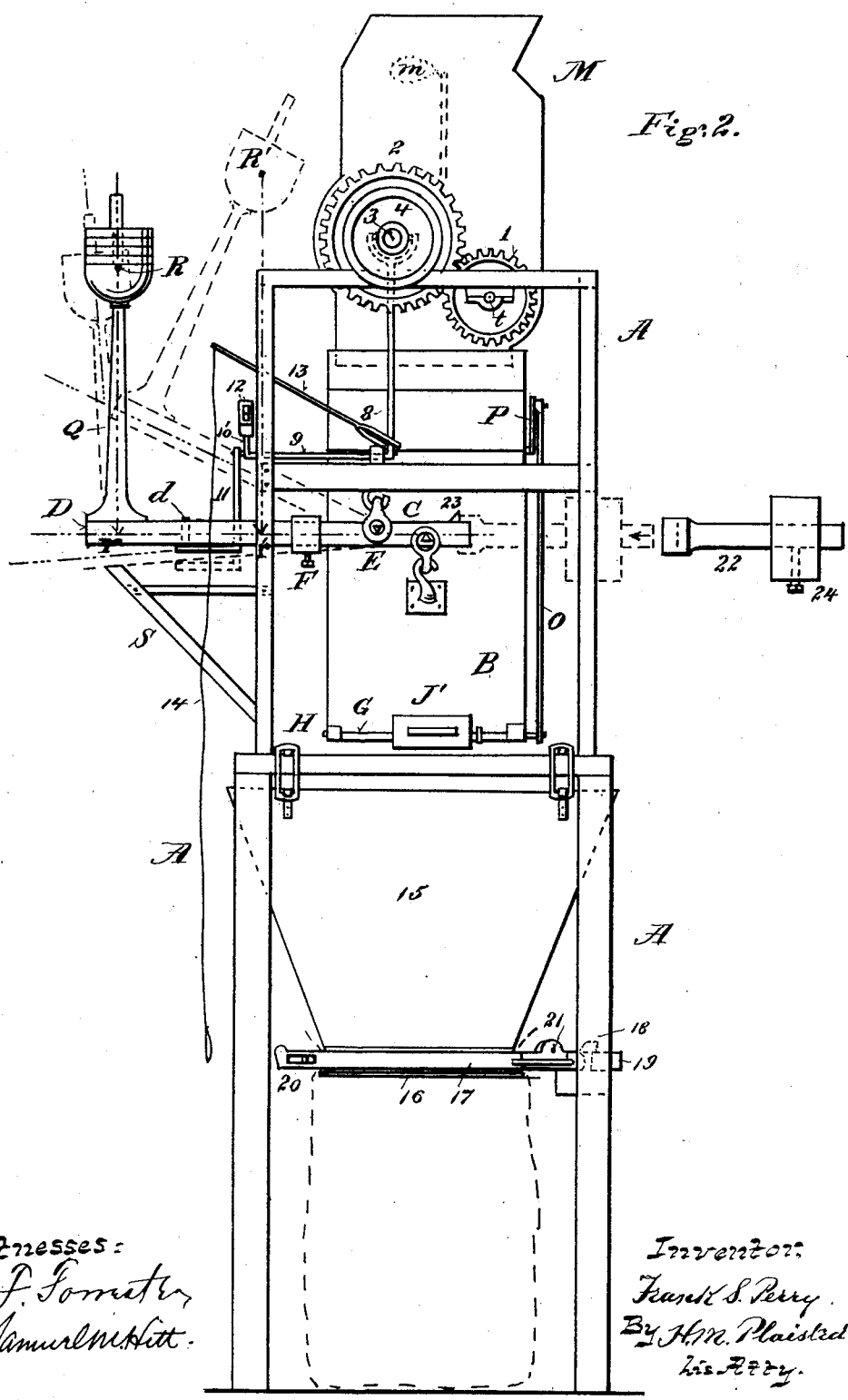
Figure 3:
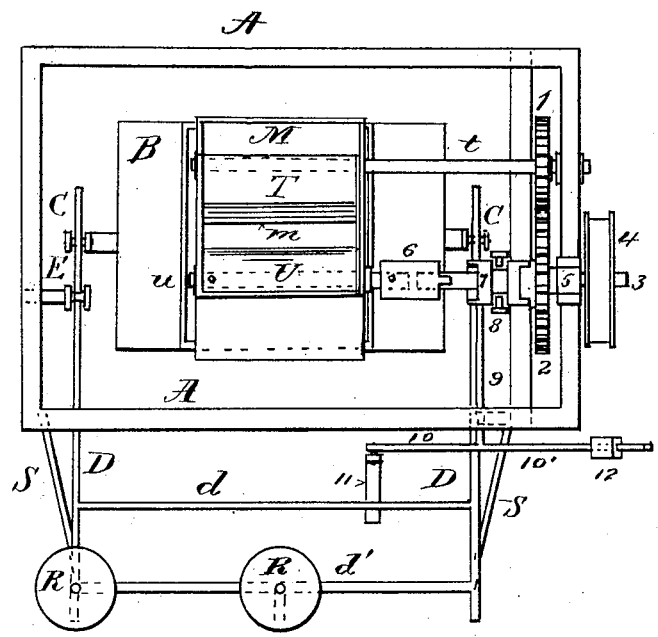
Figure 4:
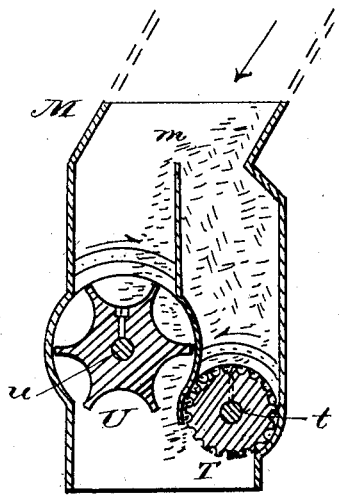

In the accompanying drawings, on which like reference characters indicate corresponding parts, Figure 1 represents a front view of a weighing-machine exemplifying my improvements; Fig. 2, a side view of the same; Fig. 3, a plan view; Fig. 4, a vertical section of the feed-spout on the line $x\,x$ of Fig. 1 and looking to the right; Fig. 5, a vertical sectional view of one form of feed-hopper; Fig. 5ª, a side view of the same, and Fig. 6 a plan view of a bag-holder.

My main object in this invention is to attain simplicity in construction and arrangement of parts and effectiveness in the operation of the said parts, securing accuracy in weighing automatically and continuously predetermined quantities of the commodity supplied to the machine.

Referring to the drawings, the letter A designates a suitable framework of perpendicular and horizontal supports, within which is mounted the weighing-hopper B, adapted to move a slight distance up and down in the discharge and receipt of its load. It is suitably pivoted at C to the beam D, which in turn is fulcrumed at E and supported in the usual or approved manner by the framework A, so that the beam is substantially horizontal in its normal position. An adjustable sliding weight F on the beam is provided for fineness of adjustment for a predetermined load.

The hopper is open at the top and the bottom and is preferably rectangular in cross-section, as shown. The bottom is provided with a pivoted valve G, horizontally hinged at H to one edge of the hopper and held closed by a catch I, pivotally mounted on the side of the hopper and provided with an adjustable weight J or other means to cause the normal engagement of the bottom and catch. The weight J or its equivalent effects the return of the bottom after the discharge of the load. The catch is tripped by the engagement of its arm with the projection K on the framework when the hopper descends under its load, as will be hereinafter described.

A cut-off device for the feed consists of a pair of flap-valves L L, pivotally mounted near the upper end of the hopper and adapted to rotate toward each other and form a temporary cross-partition for the receipt of the feed from the feed-spout M above. Segmental gears N, mounted on the shafts of the valves, or other suitable interconnections cause them to be turned upward toward each other from their normal vertical position to a horizontal one, as indicated by dotted lines, when the bottom G opens to discharge its load, and thereby operates the rod O and crank P of the shaft of L' or other suitable connections. Thus when the bottom G is free from the control of its catch I by the descent of the hopper and its predetermined load the feed is cut off instantly by the flap-valves L L', simultaneously operated with and by the opening of the bottom G. The double forms of valves shown, with overlapping edges at the center, avoid jamming of the feed by the valve and provide an easy sharp cut-off of the stream of feed.

If desired, I may use a compartment-hopper, such as illustrated in my application filed September 24, 1897, Serial No. 652,842, which compartment-hopper is more especially adapted for smaller quantities—say up to one hundred pounds of cotton-seed meal—while this style of hopper herein shown will weigh relatively upward of two hundred pounds as its capacity and of course in smaller quantities, according to its size and the adjustment of load on the scale-beam, as will now be described.

The scale-beam D is double, as shown in the plan view, Fig. 3, and provided with a cross-bar $d$ and otherwise braced, if necessary. Upon the outer ends of the arms or otherwise are located vertical posts Q, of a height preferably about the same as the distance to the fulcrum E. On the top of these posts or standards is a weight which is adjustable as to the amount of sections, perforated or otherwise, adapted to be mounted on the standard in the same position at each adjustment. Thus a perforation of semicircular form allows for its engagement with matching pins on the post Q, so that the adjustable weight will not be turned and falsify the balance. The function of this moving balance-weight at a height above the plane of the fulcrum is to carry it inward a relatively greater distance when the beam tips than would result if the weight were in the same plane as the fulcrum itself. Thus in Fig. 2 the dotted position of the balance-weight at R' is vertically over the point $r'$ in a horizontal plane of the beam. Had it been mounted on the beam-axis it would have been more nearly vertical over the point $r$. The difference between $r$ and $r'$ represents substantially the lessened leverage exerted by the weight R due to my construction, and therefore indicates the lessened effect the weight R has upon the hopper and its load, thereby securing, as desired, a quicker and stronger descent of the hopper, resulting in a quick tripping of the catch, opening of the door or bottom G, and cut-off of the material by the valves L L'. The height of the post Q may be varied, and the weight may be distributed on both arms or located in the middle on the cross-bar $d$, as may be desired.

A brace or other support S for the scale-beam maintains its position a little below the horizontal plane when the hopper is being filled. The lower dotted line, Fig. 2, indicates the position of the beam in starting to fill. When the predetermined quantity has been supplied to the hopper and the load causes the scale-beam to rise, the descent of the hopper is hastened by my arrangement of the balance-weight R, as above described.

The construction so far described may be used practically with good results; but in order further to increase the accuracy of my machine I provide a regulated device for the feed by which it is delivered in a uniform stream to the hopper as the final portion of the load is made up.

Referring to Fig. 4, it will be seen that the feed-spout M is provided with two compartments or branch outlets by means of a vertical partition $m$. The top of the feed-spout is inclined, as shown in Fig. 4, so that one compartment will receive the supply from the mill and be filled, but the overflow will be delivered to the other compartment. In this first compartment, therefore, I provide a mounted feed-roll T, having corrugations adapted to deliver the feed in a uniform stream. The other compartment is provided with a roll U, having larger corrugations or teeth, which will receive the supply from the mill as an overflow from the opposite compartment and will deliver it rapidly to the hopper. Now I provide mechanism, to be presently described, which will change the feed from the roll U when a predetermined quantity has been delivered and will supply the balance of the load to the hopper in a uniform stream delivered by the feed-roll T. On the shaft $t$ of the fine-feed roll is mounted a spur-gear 1, meshing with a loose gear 2 upon a shaft 3, carrying a driving-pulley 4, driven by a belt or otherwise uniformly. This shaft 3 is mounted in a box 5 on the frame, and the other end is journaled in the clutch-collar 6, which is secured to the shaft $u$ of the fast-feed roll. Figs. 1 and 3 show this construction. The spur-gear 2 has a clutch-face opposite the collar 6, and on the shaft 3 is slidingly mounted a driving-clutch 7, having clutch-faces adapted to engage alternately with said collar and said gear. The driving-clutch turns with the shaft 3 by means of a feather-key and slot engagement, as shown in Fig. 3. When the driving-clutch is engaged with the collar 6, the motion of the pulley and shaft 3 is transmitted through the collar to the fast-feed roll U; but when the said driving-clutch engages the loose gear 2, meshing with the gear 1, the feed-roll T is driven. In order to effect such alternate engagement, I provide a fork-lever 8, engaging with a groove in the driving-clutch, as shown, and forming an extension from the shaft 9, which is provided with a crank-arm 10, substantially at right angles to the lever-arm 8, and carries a hook in the form of an L 11 or other suitable connection adapted to engage with the cross-bar $d$ or other portion of the scale-beam. By such engagement the bar holds the driving-clutch in connection with the collar 6, turning the fast roll U as long as the scale-beam is in its lower position resting on the support S. I provide a normal tendency for the clutch 7 to leave the collar 6 and engage with the gear 2, operating the uniform-feed roll. One way of producing this normal tendency is by the gravitation of the adjustable weight 12, slidingly mounted on an arm 10' on the other side of the shaft 9 from the crank 10. This weight may be shifted in and out and tends to turn the shaft 9 and the fork-lever 8 to throw the clutch 7 into engagement with the gear 2. At the same time the weight exerts a lifting tendency on the crank 10, and thence on the scale-beam engaged therewith in its lower position. Though the said beam is balanced to rise at a predetermined load—say one hundred pounds—yet this lifting tendency of the adjustable weight 12 causes it to rise to a horizontal position when the amount of load in the hopper nearly reaches the predetermined amount. This initial rise of the beam to the level will allow the clutch 7 to change the feed from the roll U to the final roll T. The beam having reached the level position is now no more influenced by the weight 12, which has thrown the clutch to its limit, and hence the beam D will remain in such position until the balance of the load is supplied through the fine feed, whereupon, having received its full load, the beam will tip to its extreme upper position, as indicated by dotted lines in Fig. 2, and the loaded hopper will descend and discharge its load in the same manner as previously described. The weight 12 or other adjustable device for effecting such normal tendency of the shifting-clutch to change the feed may be increased by sliding it farther out on the arm 10' or otherwise, and thereby increase the lifting tendency upon the scale-beam, causing it to rise sooner than before and changing the feed sooner, and thereby requiring a longer operation of the fine-feed roll before completing the predetermined load. On the other hand, an adjustment of the weight 12 inward on the arm 10' or otherwise decreasing the tendency of the shift-clutch to change the feed from one roll to another will diminish the lifting tendency on the beam and retard the shift, and thus decrease the portion of the load remaining to be supplied—that is to say, the variation of the normal tendency of the clutch to change the feed from coarse to fine provides for feeding more or less of the last of the final portion of the load to the hopper through the uniform fine feed. Since the compartment in which said fine-feed roll is located is always supplied with the full amount and is not dependent upon the variable speed of the mill above or other source, the stream delivered to the hopper from the fine-feed roll is always uniform and regular. On the other hand, the fast roll, feeding, as it does, a greater quantity through its larger grooves, tends by the momentum of this coarse feed to tip the beam sooner than the weight for which it was set. It will be seen, therefore, that the fine feed in the regular uniform stream reduces to a minimum this tendency to weigh the momentum of the falling supply, as well as the deadweight material itself. Hence this change of feed acts so that when the predetermined load is in the hopper the cut-off is effected with accuracy and quickness. Thus the crank 10 and the weighted extension 10' of the shaft 9 comprises a secondary scale-beam, in which the shaft 9 is the fulcrum. The adjustment of the weight 12, as above described, varies the quantity passed through the fine-feed roll and likewise varying the lifting tendency on the scale-beam D.

The fast feed U may be dispensed with in some cases and the overflow be delivered through that branch directly from the mill above till the fine feed be thrown on, as before described. This will depend somewhat on the regularity of discharge of the mill above. I do not confine the action of this secondary scale-beam and the change-off mechanism to the construction shown, as it will be seen that the secondary scale-beam may operate the fine feed through the clutch shown or other intervening mechanism without departing from the principle of this part of my invention—viz., the coöperation of the secondary scale-beam with the scale-beam proper, together with a feed-regulating mechanism.

In my previous application, above referred to, I have shown a valve for the overflow-feed outlet, and such valve I do not claim specifically in this application. I have also shown in that case a main and a secondary scale-beam, one mounted on the other, with a rotatable ball-weight, which specific construction is not claimed in this present application.

In the present application it will be seen that the branch or outlet containing the fine feed is always supplied with a reserve quantity sufficient to complete the load being weighed, even though the mill furnishing the supply should be stopped at about the time the feed was changed.

It is evident that if the continuously-rotating driving-clutch 7 be shifted along the shaft 3, so as to be intermediate between the collar 6 and loose gear 2, both feeds will be at rest. Any simple device operated by hand may be employed for this purpose, such as a pivoted shift-rod 13, operated by a connection 14, within reach of the man tending the machine. The feed-spout and partition have segmental portions covering one or more corrugations of the respective rolls, so that whatever the position in which they may stop the feed will not slip by.

Below the weighing-hopper is located the discharge-hopper 15, tapering to a neck, preferably round, and provided with a lip 16 or otherwise adapted to support the neck of the bag being filled. In Fig. 6 I have shown a plan view of a bag-holder which may be operated by one hand, while the other hand of the packer supports the bag till it is held by the device. This device consists of two semicircular clips 17, each pivoted at 18 to part of the frame or elsewhere and provided with intermeshing gear-segments 19 or otherwise adapted to operate simultaneously in opposite directions when one or the other is moved. A spring-catch 20 is carried by one clip and has ratchet-teeth to engage with the other clip. Thus when the operator with one hand throws the clips together the teeth of the spring will hold the clips against the bag's neck, and the teeth on the interior of the clips will prevent its disengagement from the discharge-hopper. When the bag is filled, by throwing out the catch 20 the compression-spring 21, mounted on the rod 2 at the rear of the clips, will throw them open, as indicated by dotted lines. Other means may be employed to hold the neck of the bag. My machine is thus automatic in its weighing and discharging operations, the attention of the packer being directed to the placing of the bags in position and removing them when filled. When the machine is once properly set for the desired load and material, it operates continuously and automatically as long as the supply is kept up.

In order to test the balance of the machine, I provide an extension which is detachable and may be used for any definite load and material. This tester consists of a marked arm 22, having a socket fitting on the hopper end of the scale-beam D up to a shoulder 23 or otherwise, so it may be placed accurately in the same position at each test. A sliding scale-weight 24 is adjustable on the arm, so that when the scale-beam D is set for a certain load and material the weight 24 may be adjusted to bring the beam to a balance with the empty hopper. The weight 24 is then fixed by a set-screw or otherwise on the arm of the tester, so that the attachment may be laid away and may be used the next day or at any other time when it is desired to test the action of the machine and see if it is weighing accurately, as at first. This attachment serves also for the quick adjustment of the machine to weigh a predetermined load of the specified material. It is evident that I may provide a number of such attachments adapted for other loads or other material, and by mounting the proper attachment on the scale-beam, as above described, I can quickly adjust the machine to weigh any desired material in any desired amount. At the same time each particular attachment acts as a tester of the balance of the hopper for that load and that material for which it has been adjusted. It will thus be seen that the accuracy of operation is guarded and the efficiency increased in all the main points of construction as exemplified by my improvements. I do not limit myself, however, to the exact form and arrangement of parts herein shown and described, but may vary the same without departing from the principle of my improvements as above described.

Having thus fully described my invention, what I claim as new, and desire to secure by Letters Patent, is—

1. An automatic weighing-machine, comprising a weighing-hopper, a scale-beam supporting said hopper, having weights R on posts Q, a secondary beam—consisting of the crank 10, the extension 10′ and adjustable weight 12, and fulcrumed at 9—provided with a shift-arm 8, a driving-clutch operated by the shift-arm, a fine and a coarse feed device, and intermediate clutch connections between each feed device and said driving-clutch, substantially as described and for the purpose set forth.

2. A weighing-machine comprising a weighing-hopper, a scale-beam proper supporting said hopper, a secondary beam and adjustable weight therefor operatively connected to said beam proper, a feed-spout having two branches, a coarse and a fine feed roll mounted in said branches respectively, a driving-shaft, a double-faced driving-clutch slidingly mounted on said shaft, a matching driving-clutch on each side of said sliding clutch, one piece connected to the coarse-feed roll, and the other piece to the fine-feed roll—and a shift-lever for said driving-clutch operatively connected to said secondary beam to be actuated when the secondary beam effects the movement of the beam proper.

3. A weighing-machine comprising a weighing-hopper and a feed-regulating mechanism therefor, consisting of a feed-spout having a vertical partition forming two outlets, a feed-roll mounted in each outlet opposite curved tangent portions of the spout and partition, and means to operate said rolls substantially as described.

4. A weighing-machine comprising a weighing-hopper, a scale-beam therefor, and a feed-spout having a vertical partition forming two outlets, and an inclined top for said spout near said partition, whereby the supply will fill one branch outlet and then overflow to the other, feed-rolls mounted in said branch outlets, and means to drive said rolls alternately.

5. In a weighing-machine, the combination with a movable hopper and a scale-beam supporting said hopper, of an attachment for said scale-beam, consisting of an extension for the hopper end of the beam, and a weight slidingly mounted on said extension, adapted to balance the beam at any predetermined adjustment of the scale-beam for any predetermined load and material.

6. In a weighing-machine, the combination with a movable hopper, and a scale-beam supporting said hopper, of a series of attachments, each consisting of an extension for the hopper end of the beam, and provided with an adjustable weight adapted to balance the scale-beam when the latter is set for any predetermined load of particular commodity.

In testimony whereof I affix my signature in presence of two witnesses.

FRANK S. PERRY.

Witnesses:
T. FORRESTER,
SAMUEL M. HITT.